United States Patent Office
3,514,441
Patented May 26, 1970

3,514,441
PROCESS FOR PREPARING STEROID-ACYLATES OF A CARDIAC GLYCOSIDE AND PRODUCTS THEREOF
Daisuke Satoh, Nishinomiya-shi, and Tetuo Minesita, Suita-shi, Japan, assignors to Shionogi & Co., Ltd., Osaka, Japan
No Drawing. Filed June 11, 1968, Ser. No. 736,002
Claims priority, application Japan, June 20, 1967, 42/39,488
Int. Cl. C07c 173/00
U.S. Cl. 260—210.5         15 Claims

ABSTRACT OF THE DISCLOSURE

Simple and economical process for preparing steroid-acylates of cardenolide tridigitoxoside by reacting 3'''- or 4'''-crabonate or 3''',4'''-cyclocarbonate with acylating agent, followed by hydrolysis. The compounds of this invention are cardiotonic agent of digitalis-like activity, utilized in medicament of human and veterinary use.

---

The present invention relates to a novel and economical process for preparing pharmacologically valuable steroid-acylates of cardenolide tridigitoxosides and products thereof. More specifically, the present invention relates to a process for preparing a compound of the general formula:

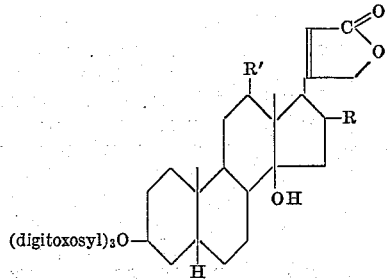

wherein R is a hydrogen atom, a hydroxyl group or an acyloxy group; R' is a hydrogen atom, a hydroxyl group or an acyloxy group; provided that one or both of R and R' is acyloxy group, which comprises reacting 3'''- or 4'''-carbonate or 3''',4'''-cyclocarbonate of a cardenolide tridigitoxoside with an acylating agent to prepare 12- and/or 16-acyl sugar-carbonates, and then the product is hydrolyzed with an acid or a base to obtain the objective compounds of the present invention.

The original substances of the present invention, namely gitoxin, digoxin and diginatin are obtained from the plant of digitalis family in ample quantities but their lower solubility in various solvents restricted their medical use. Many efforts have been directed to obtain a compound of favourable physical properties and partial acylates have been said to be the case. However, partial acylation of the glycosides or partial hydrolysis of the polyacylate of the glycosides resulted in a number of by-products, and the methods have not been used in industrial scale. A method has been proposed to hydrolyze polyacylate with an enzyme preparation. Although the enzymatic method is unsuitable for industrial preparation, the best known method for production of acetate is this enzymatic hydrolysis method.

The present inventors investigated acylation of the cardenolide tridigitoxoside precisely and found 3'''- or 4'''-carbonate and 3''',4'''-cyclocarbonate are obtained preferentially by action of a carbonating agent. These compounds are represented by the partial formula:

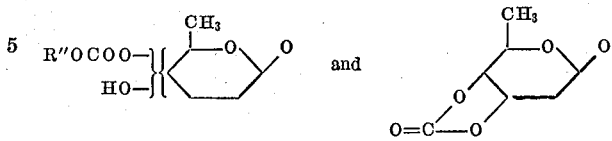

wherein R'' is a hydrocarbon group. The carbonate group protects the most reactive site of the molecule, namely 3''' and 4'''-hydroxyl groups, and the next point of attack by an acylating agent is a hydroxyl group in the cardenolide moiety other than that located at position 14.

Partial hydrolysis of the carbonate-acylate with an acid or a base occurs on the carbonic acyl group at position 4''' and/or 3''' to afford the desired acylates of the glycoside, as these ester groups are more susceptible to hydrolysis.

By the term "a corresponding acylating agent" as used in the claims is meant the acylating agents capable of forming the specified acyloxy groups R and R' of said claims.

An object of the present invention is to provide a process for preparing an acylate of a glycoside of the general Formula I. Another object of the present invention is to provide pharmacologically active compounds. Further object of the present invention is to provide a medicament for human and veterinary use containing a compound of the present invention. These and other objects of the present invention will be apparent from the following disclosure of the invention.

The process of the present invention is composed of two steps. The first step of the present invention is acylation of the starting material with an acylating agent. The second step of the present invention is partial hydrolysis of the product of the first step.

The starting material of the present invention is exemplified by gitoxin-3''',4'''-cyclocarbonate, digoxin-3''',4'''-cyclocarbonate, diginatin-3''',4'''-cyclocarbonate, gitoxin-3'''-carbonate, digoxin-3'''-carbonate, diginatin-3'''-carbonate, gitoxin-4'''-carbonate, digoxin-4'''-carbonate, diginatin-4'''-carbonate and the like. The carbonate at position 3''' or 4''' may be a half ester with a hydrocarbon group.

Preferred acylating agent of the first step involves an organic or inorganc acid anhydride or acid halogenide, acyl group of which may be exemplified by acyl group of a carboxylic acyl group, such as formyl, acetyl, propionyl, butyryl, isobutyryl, valeryl, isovaleryl, enanthoyl, octanoyl, decanoyl, acryl, methacryl, deconyl, benzoyl, trifluoroacetyl, phenoxyacetyl, hemisuccinyl, citryl, or the like, or a sulfonic acyl group such as methanesulfonyl, ethanesulfonyl, propane sulfonyl, benzenesulfonyl, toluenesulfonyl, chlorobenzenesulfonyl, bromobenzenesulfonyl, nitrobenzenesulfonyl or the like or of a sulfuric, phosphoric or carbonic acyl group and the like. Other conventional type of acylating agent such as a mixed anhydride of an organic acid with an inorganic acid or a sulfonic acid, acyl imidazole, etc., may be used if necessary.

The reaction of the first step is carried out by reacting the starting material with the acylating agent. The reaction may be carried out in the presence of a base and/or an inert solvent. The preferred base involves an inorganic base such as alkali metal hydroxide, alkali metal carbonate, alkali metal hydrogen carbonate, calcium hydroxide, calcium carbonate or the like, and an organic base such as pyridine, collidine, lutidine, quinoline, ethylamine, triethylamine, and the like. The preferred inert solvent involves a hydrocarbon such as ligroin, petroleum benzine, pentane, hexane, benzene, petroleum ether, toluene, xylene or naphthalin, an ether such as diethyl ether, dimethyl ether, tetrahydrofuran, or dioxane, a ketone such as acetone or methyl ethyl ketone, an ester such as ethyl acetate or butyl acetate, a halogenated hydrocarbon such as chloroform, methylene chloride, ethyl chloride, carbon tetrachloride, dichloroethane, and other solvents such as carbon disulfide, dimethylformamide, pyridine, collidine, quinoline, alkylamines, dimethylsulfoxide, water or a tertiary or secondary or primary alcohols such as methanol, ethanol, propanol, isopropanol, butanol, amyl alcohol, iso-amyl alcohol, tert-amyl alcohol, tert-butanol, octanol and the like or the mixtures thereof.

The amount of the reagent is selected so as to obtain the best results and generally 0.5 to 10 mole equivalents is reacted with the starting material. Occasionally, decomposition of the reagent is observed and large amount of the reagent is required. However, for the presence of hydroxyl group at position 3' and 3", which must remain intact, one to three moles of the reagent may be desirable. Stability of these hydroxyl groups to acylation permits a more severe reaction condition and results in a good result in the partial acylation.

Preferred reaction temperature is selected from a temperature of range from —80° to 100° C. As the reaction of this invention is substantially partial reaction, the temperature and the reaction time is selected so as to obtain the best results according to the nature, sort and concentration of the starting material, reagent and solvent used.

The second step of the present invention is hydrolysis of the product of the first step. The hydrolysis is effected by bringing the product of the first step to contact with an acid or a base. Preferably, the hydrolysis is carried out in the presence of water and/or an inert solvent at a temperature of range between —15° C. to reflux temperature of the solvent system used. As for the acid or base of this step, there is exemplified an acid such as organic acid, e.g. formic acid, acetic acid, propionic acid, butyric acid, oxalic acid, benzenesulfonic acid, p-tolueneusulfonic acid, etc., or an inorganic acid, e.g., hydrochloric acid, sulfuric acid, nitric acid, etc., or the like and a base such as sodium hydroxide, potassium hydroxide, calcium hydroxide, triethylamine, sodium carbonate, potassium carbonate, sodium acetate, sodium hydrogen carbonate, potassium hydrogen carbonate, ammonium chloride, ammonia or the like. Especially, alkali metal carbonate, alkali metal hydrogen carbonate and ammonia are utilized preferably. A preferred inert solvent of this step is a water-miscible solvent, for instance alcohols such as methanol, ethanol, propanol, sec-butanol, tert-butanol, amyl alcohol, etc., ketones such as acetone, methyl ethyl ketone, cyclohexanone, etc., ethers such as diethyl ether, methyl isobutyl ether, dioxan or tetrahydrofuran and the other solvents such as dimethyl formamide, dimethylsulfoxide and the like. They may be a mixture with each other or a mixture with water-immiscible solvent such as hydrocarbons, halogenated hydrocarbons, esters, or the like, so as to dissolve the reagent or the starting material. Hydrolysis of this step usually requires water but in some cases the reaction may proceed via solvolysis or exchange reaction of carbonate residue and hydrogen atom of the solvent or reagent. Preferred reaction temperatures are those that range between —15° C. and 100° C., and duration of reaction time may be selected so as to obtain the best result for the partial hydrolysis of this step, for instance by detection of spots on thin-layer chromatogram of the reaction mixture. Temperature and reaction time depends on the nature, sort and concentration of reagent, starting material and solvent used.

The products of the process of the present invention may be isolated in a conventional manner from the reaction mixture. For instance, neutralization, concentration, dilution with an insoluble solvent, filtration, extraction with a solvent immiscible with water, washing, drying, evaporation of solvent, etc. The products thus obtained may be purified by a conventional method such as recrystallization, chromatography, treatment with adsorbent and related methods.

The pharmacologically active compounds of the present invention are compounds of the general Formula I, cited before.

As for the acyl group represented by R and/or R', there is exemplified an organic acyl group such as a hydrocarboncarboxylic acyl group, e.g., acetyl, propionyl, butyryl, valeryl, capryl, enanthoyl, decanoyl, crotonyl, methacryl, substituted or unsubstituted benzoyl, cyclohexanecarbonyl, cyclopentanepropionyl, phenoxyacetyl, alkoxyacetyl, halogenated acetyl, succinyl, hemisuccinyl, monocitryl, hemimalonyl, or the like and a hydrocarbonsulfonyl group such as p-toluenesulfonyl, methanesulfonyl, benzenesulfonyl, nitrobenzenesulfonyl, halogenobenzenesulfonyl or the like, and an inorganic acyl group such as phosphoryl, sulfuryl, carbonic acyl and the like.

These compounds show useful cardiotonic activities. For example, they show bradicardia, increase of tonus, heart arrest, retardation of heart rate, heart fibrillation, appearance of characteristic feature in electrocardiograms and related activities. For instance, gitoxin-16-acetate, gitoxin-16-propionate, gitoxin - 16 - benzoate, gitoxin-16-ethoxyformate, gitoxin - 16 - methoxyformate, gitoxin-16-tosylate, digoxin-12-benzoate, digoxin-12-methoxyformate and digoxin-12-tosylate showed characteristic cardiotonic response to cats, pigeons, frogs and to isolated heart muscle of guinea pigs.

These activities show the compounds of the present invention are useful for their pharmacological activities. For example, they are utilized for treatment of heart diseases, such as congestive heart caused from heart failure such as valvular affection, hypertension, arteriosclerosis, myocardial infarction, and the like or edema, anasarca, seroperitoneum, hydrothorax, dyspnea and the like caused by heart failure or arrhythmia, extrasystoles, tachycardia, auricular flutter, or the like or acute heart failure, acute congestive heart, acute heart hyposthenia, tonus disorder or the like or so called digitalization or saturation in chronic or acute cases, in a daily dose of 0.1 γ/kg. to 100 mg./kg. for human and veterinary use. The content of the compound in drugs are preferably uniform to make an unit dose of tablet, pills, capsules or the like or injections, to make a medicine utilized for maintenance doses or saturation or digitalization.

The compounds of the present invention may be utilized in a wide variety of oral or parenteral dosage forms, solely or in admixture with co-acting agents. They may be administered in a solid composition such as tablets, capsules, pills, if required in a unit dosage form, powders, granules, or the like or in a liquid composition such as injection, ointments, suspensions, solutions, emulsions, syrups, elixirs, oils or the like. They may be flavoured or colored, and tablets, granules or pills may be coated. The preparations are prepared by conventional methods inconjunction with solid or liquid pharmaceutical excipients. Suitable excipients include water, vegetable oils such as cacao oil, olive oil, peanut oil, sesame oil, or the like, glycerin, glycols, esters or the lower alcohols with fatty acids, glycerides, fatty acids, isopropyl myristate, benzyl alcohol, polyethyleneglycols, gelatine, sucrose, glucose, lactose, starches, sodium alginate, magnesium stearate, talc, kaolin, bentonite, boric acid, calcium carbonate, sodium chloride, sodium benzoate, vaselin, paraffin, acacia, tragacanth, agar, fats, lard, wool fat, resins, coloring agents, flavouring substances, emulsifying agents, solubilizing agent, buffers, stabilizers, disinfectants, and the like.

The following examples are given by way of illustration only and are not intended as limitation of the scope of the present invention, many apparent variations of which are possible without departing from the spirit and scope of the present invention.

EXAMPLE 1

(A) Into a solution of 120 mg. gitoxin-3''',4'''-cyclocarbonate in 3 ml. pyridine, there is added dropwise 0.65 ml. diethyl pyrocarbonate at 5–10° C. and kept at room temperature for 30 minutes. The reaction mixture is diluted with water and extracted with chloroform. The extract is washed with 5% hydrochloric acid, 3% aqueous sodium hydrogen carbonate and water, dried over anhydrous sodium sulfate and evaporated to leave 130 mg. residue. Purification of the residue by thin-layer chromatography and recrystallization from mixture of acetone and hexane affords 64 mg. 16-O-ethoxyformylgitoxin-3''',4'''-cyclocarbonate, M.P. 150–156° C.

(B) A solution of 60 mg. 16-O-ethoxyformylgitoxin-3''',4'''-cyclocarbonate in 15 ml. 90% ethanol containing 0.2% potassium hydrogen carbonate is kept at room temperature for 4 days. The mixture is neutralized with diluted hydrochloric acid, evaporated to remove ethanol and extracted with chloroform. The organic layer is washed with water, dried over sodium sulfate and evaporated to leave residue, which is purified by thin-layer chromatography to afford 30 mg. gitoxin-16-ethoxyformate and 8 mg. gitoxin.

EXAMPLE 2

A solution of 60 mg. gitoxixn-4''',16-di-ethoxyformate in 18 ml. 90% ethanol containing 0.2% potassium hydrogen carbonate is kept at room temperature for 4 days. The mixture is neutralized with diluted aqueous hydrochloric acid, evaporated to remove alcohol, and extracted with chloroform. The organic layer is washed with water, dried over sodium sulfate and evaporated to leave residue which is chromatographed over silica gel to afford 13 mg. starting material, 3 mg. gitoxin and 31 mg. gitoxin-16-ethoxyformate, M.P. 208–210° C., $[\alpha]_D^{22}+0.9°$ (c.=0.546, methanol).

EXAMPLE 3

(A) A solution of 150 mg. gitoxin-3''',4'''-cyclocarbonate in 4 ml. pyridine is added dropwise with 0.67 ml. dimethyl pyrocarbonate at 5–10° C. and kept at room temperature for 30 minutes. The reaction mixture is treated as Example 1(A) to afford 88 mg. 16-O-methoxyformylgitoxin-3''',4'''-cyclocarbonate, M.P. 158–162° C.

(B) A solution of 500 mg. 16-O-methoxyformylgitoxin-3''',4'''-cyclocarbonate in 150 ml. 90% methanol containing 0.2% potassium hydrogen carbonate is kept at room temperature for four days. The mixture is neutralized with hydrochloric acid, evaporated to remove methanol and extracted with chloroform. The organic layer is washed with water, dried and evaporated to obtain 450 mg. residue. Separation of the residue by thin-layer chromatography affords 95 mg. starting material, 52 mg. gitoxin and 270 mg. gitoxin-16-methoxyformate, M.P. 219–223° C.

EXAMPLE 4

Following the procedure described in Examples 1 and 3, digoxin-3''',4'''-cyclocarbonate is transformed into digoxin-12-ethoxyformate and digoxin-12-methoxyformate.

EXAMPLE 5

(A) A mixture of 100 mg. gitoxin-3''',4'''-cyclocarbonate, 1.5 ml. pyridine and 0.35 ml. acetic anhydride is kept at room temperature for 1.5 hours. The mixture is added with ice-water and extracted with chloroform. The extract solution is washed with 5% aqueous hydrochloric acid, 3% sodium hydrogen carbonate and water, dried over anhydrous sodium sulfate and evaporated to leave 98 mg. residue. Purification of the residue by thin-layer chromatography affords 65 mg. 16-O-acetylgitoxin-3''',4'''-cyclocarbonate, M.P. 170–178° C.

(B) A solution of 100 mg. 16-O-acetylgitoxin-3''',4'''-cyclocarbonate in 30 ml. mixture om acetone and water (3:1) containing 0.4% potassium hydrogen carbonate is kept at room temperature for 5 days. The mixture is neutralized with 5% aqueous hydrochloric acid, evaporated to remove acetone and extracted with chloroform. The chloroform extract is washed with water, dried over anhydrous sodium sulfate and evaporated to leave 90 mg. residue. Purification of the residue affords 62 mg. gitoxin-16-acetate, M.P. 235–237° C.

EXAMPLE 6

(A) A mixture of 150 mg. gitoxin-3''',4'''-cyclocarbonate, 1.5 ml. pyridine and 0.48 ml. propionic anhydride is kept at room temperature for 4 hours. Then the mixture is added with ice-water and precipitate separated out is collected by filtration and dried in vacuo. Recrystallization of the precipitate from mixture of acetone and hexane affords 121 mg. 16-O-propionylgitoxin-3''',4'''-cyclocarbonate, M.P. 172–182° C.

(B) A solution of 100 mg. 16-O-propionylgitoxin-3''',4'''-cyclocarbonate in 20 ml. mixture of acetone and water (3:1) containing 0.4% potassium hydrogen carbonate is kept at room temperature for 7 days. The mixture is neutralized with 5% aqueous hydrochloric acid, evaporated to remove acetone and extracted with chloroform. The extract is washed with water, dried over anhydrous sodium sulfate and evaporated to leave 92 mg. residue. Purification of the residue by thin-layer chromatography and recrystallization from acetone and hexane affords 61 mg. 16-O-propionylgitoxin, M.P. 190–198° C., $[\alpha]_D^{24}+8.4°$ (c.=0.498, chloroform).

EXAMPLE 7

(A) A mixture of 150 mg. gitoxin-3''',4'''-cyclocarbonate, 3 ml. pyridine and 1.260 g. benzoic anhydride is kept at room temperature for 4 days. Then the mixture is diluted with water and extracted with chloroform. The extract is washed with 5% aqueous hydrochloric acid, 5% aqueous sodium carbonate and water, dried over anhydrous sodium sulfate and evaporated to leave 155 mg. residue. Purification of the residue by thin-layer chromatography and recrystallization from mixture of acetone and hexane affords 95 mg. 16-O-benzoylgitoxin-3''',4'''-cyclocarbonate, M.P. 165–175° C.

(B) A solution of 65 mg. 16-O-benzoylgitoxin-3''',4'''-cyclocarbonate in 10 ml. mixture of acetone and water (3:1) containing 0.4% potassium hydrogen carbonate is kept at room temperature for 5 days. The mixture is neutralized with 5% aqueous hydrochloric acid, evaporated to remove acetone and extracted with chloroform. The extract is washed with water, dried over anhydrous sodium sulfate and evaporated to leave 42 mg. residue. Recrystallization of the residue from aqueous acetone affords 32 mg. gitoxin-16-benzoate, M.P. 206–210° C.

EXAMPLE 8

Following the procedure described in Example 6 but substituting propionic anhydride with tosyl chloride or succinic anhydride, there is obtained gitoxin-16-tosylate or gitoxin-16-hemisuccinate, respectively.

EXAMPLE 9

Following the procedure described in Examples 5, 6, 7 and 8, digoxin-3''',4'''-cyclocarbonate is treated with acetic anhydride, propionic anhydride, benzoic anhydride and tosyl chloride, then hydrolyzed to obtain digoxin-12-acetate, digoxin-12-propionate, digoxin-12-benzoate and digoxin-12-tosylate, respectively.

What we claim is:

1. A two step process for preparing a cardenolide tridigitoxoside acylate of the general formula:

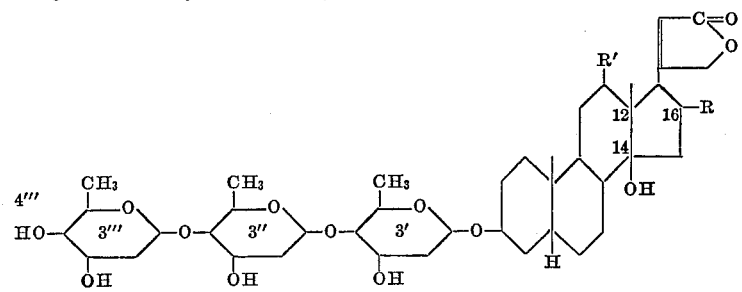

wherein one of R and R' represents an acyloxy group selected from the group consisting of methoxyformyloxy, ethoxyformyloxy, acetoxy, propionyloxy, butyryloxy, isobutyryloxy, valeryloxy, isovaleryloxy, enanthoyloxy, octanoyloxy, decanoyloxy, acryloxy, methacryloxy, decenoyloxy, benzoyloxy, trifluoroacetyloxy, phenoxyacetyloxy, hemisuccinyloxy, citryloxy, methanesulfonyloxy, ethanesulfonyloxy, propanesulfonyloxy, benzenesulfonyloxy, toluenesulfonyloxy, chlorobenzenesulfonyloxy, bromobenzenesulfonyloxy, nitrobenzenesulfonyloxy, sulfo-oxy and phosphonoxy and the other is hydrogen, which comprises reacting a compound selected from the group consisting of compounds represented by the general formula:

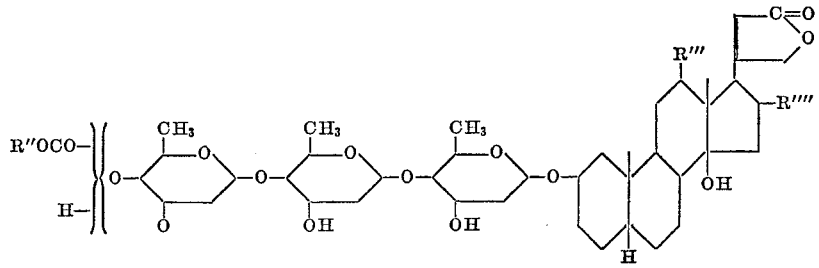

or

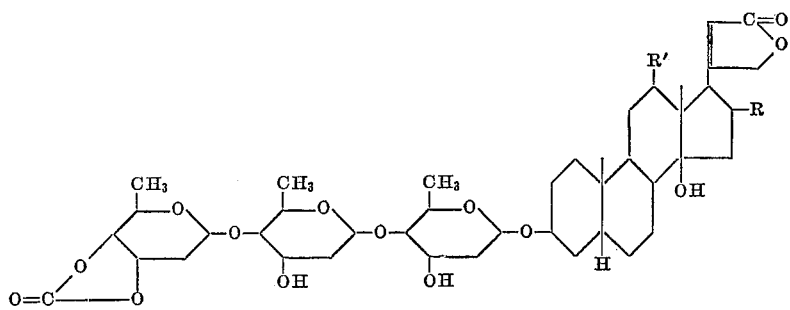

wherein one of R''' and R'''' is hydroxyl and the other hydrogen and R'' is a hydrocarbon group, with a corresponding acylating agent to afford the corresponding 12- and/or 16-acylate as set forth above, followed by hydrolysis of the carbonate group at 3''' and/or 4''' with a base or an acid.

2. A process claimed in claim 1 wherein the acylation is carried out in the presence of organic base, at a temperature of range between −80° C. and 100° C.

3. A process claimed in claim 1, wherein the hydrolysis is carried out by action of a base.

4. A process claimed in claim 1, wherein the base is selected from the group consisting of ammonia, alkali metal carbonate and alkali metal hydrogen carbonate.

5. A process claimed in claim 1, wherein the hydrolysis is carried out in a mixture of water and a solvent miscible with water at a temperature of range between −15° C. and 100° C.

6. A compound of the general formula:

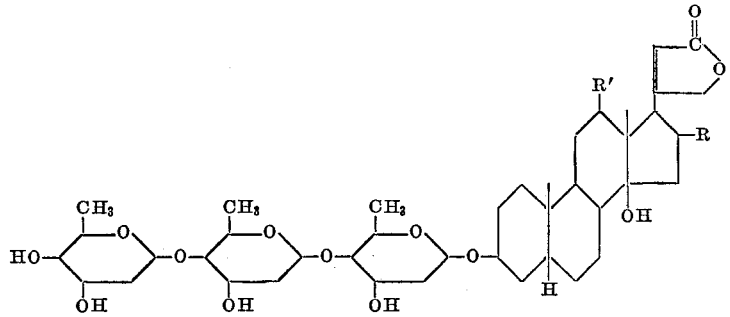

wherein one of R and R' represents an acyloxy group selected from the group consisting of methoxyformyloxy, ethoxyformyloxy, acetoxy, propionyloxy, butyryloxy, isobutyryloxy, valeryloxy, isovaleryloxy, enanthoyloxy, octanoyloxy, decanoyloxy, acryloxy, methacryloxy, decenoyloxy, benzoyloxy, trifluoroacetyloxy, phenoxyacetyloxy, hemisuccinyloxy, citryloxy, methanesulfonyloxy, ethanesulfonyloxy, propanesulfonyloxy, benzenesulfonyloxy, toluenesulfonyloxy, chlorobenzenesulfonyloxy, bromobenzenesulfonyloxy, nitrobenzenesulfonyloxy, sulfo-oxy and phosphonooxy and the other is hydrogen.

7. A compound claimed in claim 6, namely gitoxin-16-alkanoate, alkanoyl group of which contains three to ten carbon atoms.

8. A compound claimed in claim 7, namely gitoxin-16-propionate.

9. A compound claimed in claim 6, namely gitoxin-16-benzoate.

10. A compound claimed in claim 6, namely gitoxin-16-tosylate.

11. A compound claimed in claim 6, namely gitoxin-16-hemisuccinate.

12. A compound claimed in claim 6, namely digoxin-12-alkanoate, alkanoyl group of which contains three to ten carbon atoms.

13. A compound claimed in claim 12, namely digoxin-12-propionate.

14. A compound claimed in claim 6, namely digoxin-12-benzoate.

15. A compound claimed in claim 6, namely digoxin-12-tosylate.

References Cited

UNITED STATES PATENTS

| | | | |
|---|---|---|---|
| 2,395,337 | 2/1946 | Marker et al. | 260—210.5 |
| 3,184,383 | 5/1965 | Hupin | 260—210.5 |
| 3,223,587 | 12/1965 | Wilkinson | 260—210.5 |

LEWIS GOTTS, Primary Examiner

J. R. BROWN, Assistant Examiner

U.S. Cl. X.R.

424—182